US008709365B2

(12) United States Patent
Dornhaus et al.

(10) Patent No.: US 8,709,365 B2
(45) Date of Patent: Apr. 29, 2014

(54) PARTICULATE FILTER WITH HYDROGEN SULPHIDE BLOCK FUNCTION

(75) Inventors: Franz Dornhaus, Frankfurt a.M. (DE); Stephanie Frantz, Hanau (DE); Ina Grisstede, Mannheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 343 days.

(21) Appl. No.: 12/832,561

(22) Filed: Jul. 8, 2010

(65) Prior Publication Data
US 2011/0014099 A1    Jan. 20, 2011

(30) Foreign Application Priority Data
Jul. 17, 2009 (DE) .......... 10 2009 033 635

(51) Int. Cl.
| | |
|---|---|
| B01D 53/56 | (2006.01) |
| B01D 53/94 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| B01D 50/00 | (2006.01) |
| B01D 53/34 | (2006.01) |
| B01J 20/00 | (2006.01) |
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 23/70 | (2006.01) |
| B01J 23/72 | (2006.01) |
| B01J 21/04 | (2006.01) |

(52) U.S. Cl.
USPC ........ 423/213.5; 502/302; 502/303; 502/304; 502/327; 502/331; 502/332; 502/333; 502/334; 502/339; 502/345; 502/346; 502/349; 502/355; 502/415; 502/439; 422/177; 422/180

(58) Field of Classification Search
USPC ......... 502/302–304, 327, 331, 332, 333, 334, 502/339, 345, 346, 349, 355, 415, 439; 422/177, 180; 423/213.5
See application file for complete search history.

(56) References Cited

U.S. PATENT DOCUMENTS

| | | | | |
|---|---|---|---|---|
| 3,813,884 | A * | 6/1974 | Ishikawa | 60/657 |
| 5,041,270 | A | 8/1991 | Fujitani | |
| 5,254,519 | A | 10/1993 | Wan | |
| 6,916,450 | B2 * | 7/2005 | Akama et al. | 422/180 |
| 7,179,430 | B1 * | 2/2007 | Stobbe et al. | 422/180 |
| 7,351,382 | B2 * | 4/2008 | Pfeifer et al. | 422/177 |
| 7,673,448 | B2 * | 3/2010 | Voss et al. | 60/297 |
| 7,704,473 | B2 * | 4/2010 | Ikeda et al. | 423/213.2 |
| 7,722,829 | B2 * | 5/2010 | Punke et al. | 422/180 |
| 7,722,845 | B2 * | 5/2010 | Caudle et al. | 423/239.1 |
| 7,740,817 | B2 * | 6/2010 | Matsumoto et al. | 423/213.2 |
| 7,758,832 | B2 * | 7/2010 | O'Sullivan et al. | 423/213.2 |
| 7,771,669 | B2 | 8/2010 | Chigapov et al. | |
| 7,772,151 | B2 * | 8/2010 | Li et al. | 502/339 |
| 7,902,107 | B2 * | 3/2011 | Patchett et al. | 502/74 |
| 7,927,551 | B2 * | 4/2011 | Miyairi et al. | 422/168 |
| 7,963,104 | B2 * | 6/2011 | Girard et al. | 60/286 |
| 8,062,604 | B2 * | 11/2011 | Heidenreich | 422/180 |
| 8,119,075 | B2 * | 2/2012 | Dettling et al. | 422/180 |
| 8,171,727 | B2 * | 5/2012 | Doring | 60/302 |
| 8,409,515 | B2 * | 4/2013 | Ren et al. | 422/171 |
| 2002/0053202 | A1 * | 5/2002 | Akama et al. | 60/297 |
| 2004/0033175 | A1 * | 2/2004 | Ohno et al. | 422/180 |
| 2004/0052399 | A1 * | 3/2004 | Wu | 382/100 |
| 2004/0067176 | A1 * | 4/2004 | Pfeifer et al. | 422/177 |
| 2004/0221572 | A1 * | 11/2004 | Treiber | 60/297 |
| 2004/0235658 | A1 * | 11/2004 | Dornseiffer et al. | 502/439 |

| | | | |
|---|---|---|---|
| 2006/0117736 A1* | 6/2006 | Twigg ............................. | 60/274 |
| 2006/0120936 A1* | 6/2006 | Alive et al. .................. | 423/215.5 |
| 2006/0156709 A1* | 7/2006 | Twigg et al. .................... | 60/278 |
| 2006/0179825 A1* | 8/2006 | Hu et al. ........................ | 60/297 |
| 2006/0188416 A1* | 8/2006 | Alward et al. ................ | 422/180 |
| 2007/0081925 A1* | 4/2007 | Widenmeyer ................. | 422/177 |
| 2007/0104623 A1* | 5/2007 | Dettling et al. ............... | 422/177 |
| 2007/0110650 A1* | 5/2007 | Pfeifer et al. ............. | 423/213.5 |
| 2007/0119133 A1* | 5/2007 | Beall et al. ..................... | 55/523 |
| 2007/0137187 A1* | 6/2007 | Kumar ........................... | 60/299 |
| 2007/0219088 A1* | 9/2007 | Chigapov et al. ............. | 502/303 |
| 2007/0245724 A1* | 10/2007 | Dubkov et al. ................ | 60/299 |
| 2008/0003155 A1* | 1/2008 | Jia et al. .................... | 423/213.5 |
| 2008/0141661 A1* | 6/2008 | Voss et al. ...................... | 60/295 |
| 2009/0129995 A1* | 5/2009 | Pfeifer et al. ................. | 422/180 |
| 2009/0180942 A1 | 7/2009 | Caudle | |
| 2009/0263303 A1* | 10/2009 | Fokema et al. ............ | 423/239.1 |
| 2010/0058746 A1 | 3/2010 | Pfeifer et al. | |
| 2010/0092358 A1* | 4/2010 | Koegel et al. ............. | 423/213.5 |
| 2010/0223918 A1* | 9/2010 | Chigapov et al. .............. | 60/297 |
| 2010/0233046 A1* | 9/2010 | Chigapov et al. ............. | 422/177 |

FOREIGN PATENT DOCUMENTS

| | | |
|---|---|---|
| DE | 3735151 A1 | 4/1988 |
| DE | 10 2006 038 042 | 9/2007 |
| EP | 0815925 A1 | 1/1998 |
| GB | 2256375 A | 12/1992 |
| JP | 2009247931 A | 10/2009 |
| WO | 2008/101585 | 8/2008 |

OTHER PUBLICATIONS

European Search Report received in EP 10005376, mailed Oct. 28, 2010.

* cited by examiner

*Primary Examiner* — Cam N. Nguyen
(74) *Attorney, Agent, or Firm* — Smith, Gambrell & Russell, LLP

(57) ABSTRACT

The invention relates to a catalytically active particulate filter which, in addition to the properties typical of particulate filters, has hydrogen sulphide block function, and to a process for removing nitrogen oxides and particulates from the exhaust gas of internal combustion engines operated predominantly under lean conditions (so-called "lean-burn engines") using the inventive catalytically active particulate filter. This particulate filter comprises a filter body, a copper compound and an oxidation-catalytic active coating which comprises at least one catalytically active platinum group metal. The copper compound is in a second coating applied to the filter body. The two functional coatings may be applied to the filter body consecutive in the direction of flow, i.e. zoned, or layered one on top of the other.

17 Claims, 4 Drawing Sheets

PARTICULATE FILTER WITH HYDROGEN SULPHIDE BLOCK FUNCTION

Figure 1:
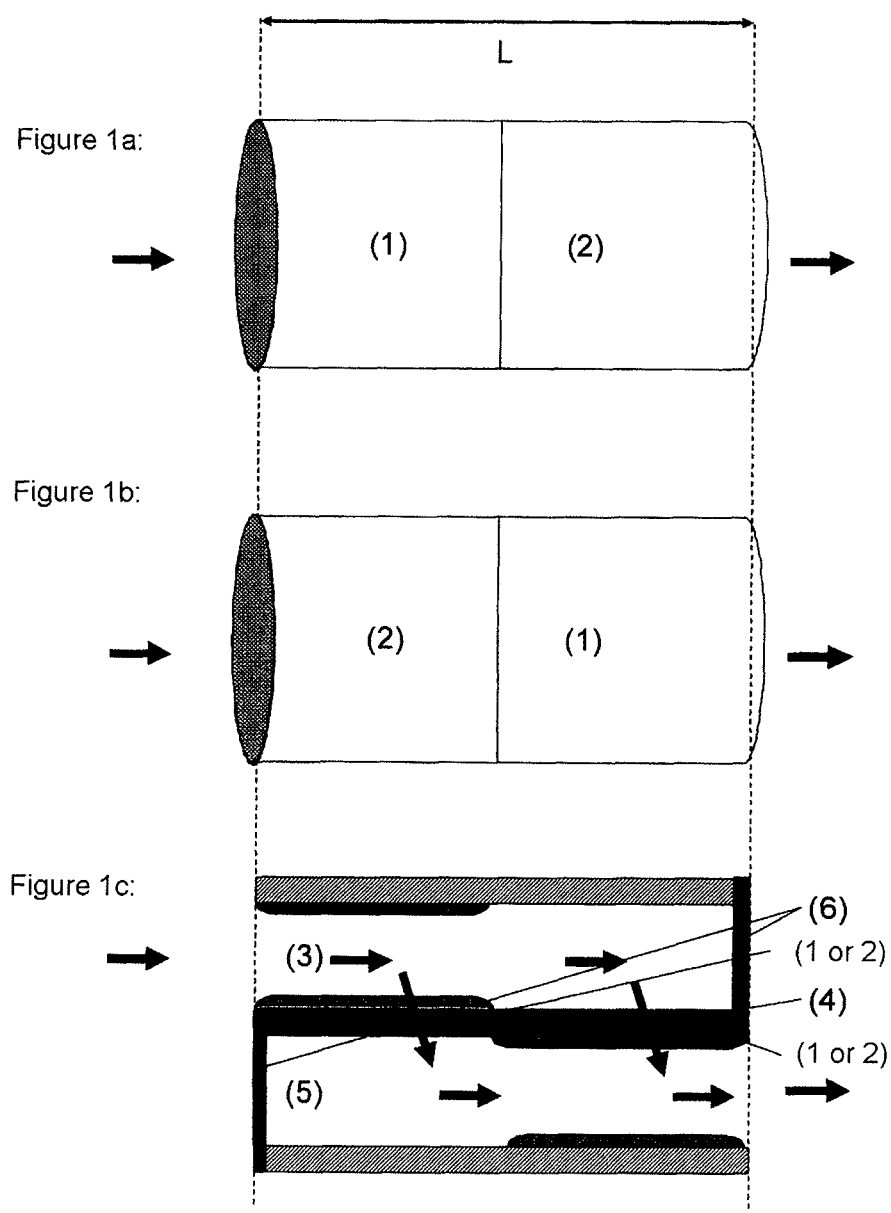

The invention relates to a catalytically active particulate filter which, in addition to the properties typical of particulate filters, has a hydrogen sulphide block function. The invention further relates to a process for removing nitrogen oxides and particulates from the exhaust gas of internal combustion engines operated predominantly under lean conditions (so-called "lean-burn engines") using the inventive catalytically active particulate filter.

The exhaust gas of lean-burn engines comprises, in addition to carbon monoxide CO, hydrocarbons HC and nitrogen oxides $NO_x$, a relatively high oxygen content of up to 15% by volume. An additional component, at least in the case of diesel engines, is also a particulate emission which consists predominantly of soot residues and possibly organic agglomerates, and originates from partially incomplete fuel combustion in the cylinder.

For diesel vehicles and, with the switch in the particulate emissions limit from the hitherto customary particle mass-based parameters to particle count-based parameters, probably also for vehicles with a gasoline engine operated predominantly under lean conditions, complying with the emissions limits stipulated by the future emissions legislation in Europe, North America and Japan will require not only nitrogen oxide removal from the exhaust gas ("denitrification") but also the cleaning thereof to remove particulates. The pollutant gases carbon monoxide and hydrocarbons from the lean exhaust gas can be rendered harmless by oxidation over a suitable oxidation catalyst. The reduction of the nitrogen oxides to nitrogen is significantly more difficult owing to the high oxygen content. For the removal of the particulate emissions, the use of specific particulate filters is unavoidable.

Known processes for removing nitrogen oxides from exhaust gases are firstly processes for selective catalytic reduction (SCR) by means of ammonia, and secondly processes using nitrogen oxide storage catalysts (NSC).

The cleaning efficiency of nitrogen oxide storage catalysts is based on storage of the nitrogen oxides in a lean operating phase of the engine by the storage material of the storage catalyst, predominantly in the form of nitrates. When the storage capacity of the NSC is depleted, the catalyst has to be regenerated in a subsequent rich operating phase of the engine. This means that the nitrates formed beforehand are decomposed and the nitrogen oxides released again are reacted with the reducing exhaust gas components over the storage catalyst to form nitrogen, carbon dioxide and water. The operation of nitrogen oxide storage catalysts is described in detail in the SAE document SAE 950809. During rich operating phases, especially at relatively high operating temperatures, hydrogen sulphide ($H_2S$) can be formed over the nitrogen oxide storage catalyst. The sulphur converted to $H_2S$ originates from organic sulphur compounds in the fuel, respectively from $SO_2$ which results therefrom during the engine combustion process, which may have been stored intermediately beforehand in the nitrogen oxide storage catalyst.

Hydrogen sulphide is a gas which is foul smelling in very small concentrations and strongly toxic in higher concentrations. Therefore these secondary emissions have to be removed completely in the exhaust system of the vehicle. For this purpose, various "$H_2S$ slip catalysts" or exhaust gas catalysts which are additionally equipped with a corresponding blocking function have been proposed in the prior art.

For example, U.S. Pat. No. 5,008,090 discloses a process for reducing the formation of hydrogen sulphide in the course of cleaning of automotive exhaust gases when they are contacted with a catalytically active composition which comprises a rare earth oxide dispersed on a first refractory inorganic oxide and a second active component deposited on a second inorganic support oxide selected from the group consisting of zirconium oxide, titanium oxide, cerium oxide, silicon oxide, magnesium oxide and zeolite. The composition also comprises noble metal. The second active component a metal is selected which forms stable sulphides under rich exhaust gas conditions. As examples of these metals which form stable sulphides under rich exhaust gas conditions, this document mentions nickel, copper, cobalt, lead and zinc.

The use of these metals, and also the use of iron, chromium and manganese as "sulphide scavengers" is typical of catalysts with $H_2S$ blocking or suppression function. Germanium has also been described as a suitable catalyst additive for $H_2S$ suppression.

JP 2191529 discloses a catalyst system for $H_2S$ suppression and for removal of other pollutant gases from exhaust gases, comprising a first catalyst comprising copper and a catalytically active component (e.g. Pt, Pd), and a second catalyst downstream comprising iron, nickel and a catalytically active component (e.g. Pt, Pd).

DE 19813654 describes a process for operating an emission control system for an internal combustion engine, which is operated with lean air/fuel ratios during the majority of the operating time. This emission control system comprises a specifically configured nitrogen oxide storage catalyst and a "sulphur trap" arranged downstream of the nitrogen oxide storage catalyst and at a distance therefrom. The "sulphur trap" may be a conventional exhaust gas catalyst which additionally comprises oxides of manganese, nickel, zinc or iron.

The exhaust gas catalysts described in the prior art which are used for suppression of hydrogen sulphide emissions typically comprise at least one platinum group metal and at least one metal active as a "sulphide scavenger" as described above. They are usually in the form of catalytically active coatings of monolithic flow-through honeycombs or as a constituent of corresponding coatings. Commonly they show unsufficient durability. In particular this applies when they at least temporary are exposed to higher exhaust gas temperatures. Since, as described at the beginning, the forthcoming stricter emission limits require that both nitrogen oxides and particulates have to be removed from the exhaust gas of internal combustion engines operated predominantly under lean conditions, corresponding temperature peaks will no longer be avoidable, since, at least in the course of the active regeneration of the particulate filter, i.e. in the course of thermally induced burn-off of soot agglomerates deposited on the particulate filter, exhaust gas temperatures of more than 400° C. typically occur.

Additionally it may apply, that at the inlet of a particulate filter arranged in a short distance downstream of a nitrogen oxide storage catalyst, exhaust gas temperatures of 650 to 750° C. occur during the desulphurization of the nitrogen oxide storage catalyst. Prior art exhaust gas catalysts which are used to suppress hydrogen sulphide emissions can normally not meet these demands.

It was therefore an object of the present invention to provide a hydrogen sulphide block function for an emission control system comprising a nitrogen oxide storage catalyst and a particulate filter to be used for internal combustion engines operated predominantly under lean conditions, which is configured such that the resulting exhaust gas system features a high thermal ageing stability with regard to all essential emission control functions. It was a further object of the invention to provide an emission control system comprising a nitrogen oxide storage catalyst, a particulate filter and a hydrogen sulphide block function, which is distinguished by favourable production costs and minimized installation space requirement.

The object is achieved by a catalytically active particulate filter comprising a filter body, a copper compound and an oxidation-catalytic active coating which comprises at least one catalytically active platinum group metal, which is characterized in that the copper compound is existent in a second coating applied to the filter body. The object is additionally achieved by the use of the inventive particulate filter for removing particulates and hydrogen sulphide from the exhaust gas of internal combustion engines operated predominantly under lean conditions, and by a process for removing nitrogen oxides and particulates from the exhaust gas of internal combustion engines operated predominantly under lean conditions, by passing the exhaust gas to be cleaned at first over an upstream nitrogen oxide storage catalyst and subsequently over an inventive catalytically active particulate filter, which is arranged downstream of the nitrogen oxide storage catalyst.

The inventors have found that, surprisingly, a spatial separation of the "sulphide scavenger" from the catalytically active noble metal leads to a significant improvement of the long-term stability of the resulting slip catalyst, even at high temperatures. We believe that this is traceable back to the fact that the spatial separation of the copper used as the "sulphide scavenger", which is characterized in that it oxidizes sulphide in the presence even of very small amounts of oxygen very rapidly catalytically to sulphur oxides, and of the catalytically active platinum group metal prevents alloy formation between these two components. Such alloy formations lead to significant losses in catalytic activity of the platinum group metals. The higher the exhaust gas temperatures to which the component is exposed, the more rapidly the alloy formation starts and the more completely it proceeds. The spatial separation of the copper compound from the oxidation-catalytic active coating thus ensures that the hydrogen sulphide block function remains permanently stable even in the case of active filter regenerations which take place periodically, in the course of which exhaust gas temperatures of up to 650° C. can occur at the inlet of the filter. The combined arrangement of oxidation-catalytic active coating and of the hydrogen sulphide block function provided by the coating comprising the copper compound on the filter can additionally avoid the incorporation of an additional unit into the exhaust system. This is advantageous especially because every emission control unit makes a significant contribution to an increase in the exhaust gas backpressure in the exhaust system and hence constitutes a cause of productive losses in engine power. In addition, this achieves minimization in the overall costs and in the installation space required by the exhaust system.

In the case of catalytically active particulate filters, it is of particular significance that the coating by which the catalytic function of the component is achieved is configured such that the backpressure of the coated filter does not exceed a critical backpressure which is about 20% higher than the backpressure of the uncoated filter body. In order to ensure this, the possible arrangements of the two coatings in the inventive particulate filter are of particular significance.

In preferred embodiments, the oxidation-catalytic active coating on the filter body forms a zone which covers 10 to 90%, more preferably 30 to 70% and most preferably 30 to 50% of the total length of the filter body. The coating comprising the copper compound forms a second zone which is attached to it and covers the rest of the length of the filter body. Such a zoned configuration of the two coatings on the filter body minimizes, in the best possible way, the contact area of the two coatings with one another and hence also the probability of a thermally induced migration of mobile copper atoms into the platinum group metal-containing zone. Poisoning phenomena attributable to alloy formation of the platinum group metal with "displaced" copper, which significantly reduce the catalytic activity of the oxidation-catalytic active coating, are thus very substantially prevented even in the case of stresses on the component at high exhaust gas temperatures over a long operating time.

In embodiments of the inventive particulate filter with a zoned arrangement of the coatings as described above, it is possible to use all filter bodies composed of metal and/or ceramic materials known in the art. These include, for example, metallic woven and knitted filter bodies, sintered metal bodies and foam structures composed of ceramic materials. Preference is given to porous wall-flow filter substrates composed of cordierite, silicon carbide or aluminium titanate. These wall-flow filter substrates have inlet and outlet channels, the outflow ends of the inlet channels and the inflow ends of the outlet channels each being closed by gas-tight "plugs". This forces the exhaust gas to be cleaned, which flows through the filter substrate, to pass through the porous wall between inlet and outlet channels, which causes an excellent particulate filter effect. The coatings, in the zoned embodiments with a wall-flow filter substrate, are preferably predominantly applied in the porous walls between inlet and outlet channels.

FIG. 1 shows a diagram of preferred embodiments of an inventive filter provided with a zoned coating, in this case of a wall-flow filter with zoned coating. In the embodiment shown in FIG. 1a, the oxidation-catalytic active coating (1) is configured as the upstream zone, and the coating (2) comprising the copper compound as the downstream zone. FIG. 1b shows an embodiment with the reverse arrangement of the zones. FIG. 1c is a detail from the two embodiments shown above. It shows an inlet channel (3) and an outlet channel (5), the two being separated by a porous wall (4) and being closed alternately by a gas-tight plugs (6). Both coatings (1) and (2) are introduced into the wall independently of the sequence selected in flow direction. Since the upstream zone is preferably applied by pumping a suitable coating suspension into the inlet channels, and the downstream zone is correspondingly preferably applied by pumping a suitable coating suspension into the outlet channels, there may be on-wall coating excesses especially in the case of relatively large amounts of coating.

Zoned inventive filters as in FIG. 1a, in which the oxidation-catalytic active zone is on the upstream side, exhibit, as well as a very good hydrogen sulphide block function which is provided by the zone comprising the copper compound on the downstream side, in particular outstanding oxidation activity with respect to the primary carbon monoxide CO and hydrocarbon HC pollutant gases also present in the exhaust gas. They are preferably used in exhaust systems in which these emissions cannot be reduced sufficiently by upstream emission control units such as oxidation catalysts and/or nitrogen oxide storage catalysts with additional oxidative action. The excellent oxidative activity thereof with respect to CO and HC is probably attributable in particular to the fact that the oxidation-catalytic active coating, the function of which is preferably provided by platinum and/or palladium as the catalytically active component, is concentrated at the filter inlet and hence at the hottest point in the filter. The minimum temperatures (light-off temperatures) required for the CO and HC oxidation therefore exist under standard operation conditions.

Zoned embodiments of the inventive filter, in which the coating comprising the copper compound is present as the upstream zone (cf. FIG. 1b), exhibit improved hydrogen sulphide block function compared to the aforementioned configurations. They are suitable especially for use in exhaust systems of vehicles for which operation with low-sulphur fuel cannot be ensured, and in which frequent active desulphurizations of an upstream nitrogen oxide storage catalyst accordingly have to be expected. Furthermore, the downstream arrangement of the oxidation-catalytic active coating exhibits clear advantages when, in the case of active regenerations of the particulate filter for the purposes of thermally induced soot burn-off by incomplete conversion of the soot, hydrocarbons result from the hydrocarbon components adhering to the soot ("volatile organic fraction", VOF) or carbon monoxide as secondary emissions. Such secondary emissions are converted very effectively over a platinum group metal-containing zone arranged on the downstream side to carbon dioxide, $CO_2$.

Other arrangements of the coating also constitute inventive solutions to the problems discussed at the outset. This is especially true for embodiments in which the filter body is a porous wall-flow filter substrate composed of cordierite, silicon carbide or aluminium titanate, and in which one of the two functional coatings is present in the porous wall between inlet and outlet channels and extends over the entire length of the device. The other functional coating in each case is then applied as an on-wall coating, either in the inlet channels or in the outlet channels. It may cover the porous wall containing the first functional coating over the entire length of the component, or form a zone which only partly covers the porous wall comprising the first functional coating. According to the selection of the resulting coating form, the different properties of the inventive particulate filter occur in different strength.

Thus, advantages regarding the hydrogen sulphide block function are achieved if the coating comprising the copper compound is introduced into the porous walls between inlet and outlet channels or/and the exhaust gas flowing into the filter body at first comes into contact with the coating comprising the copper compound. The reason for this is that the $H_2S$-containing exhaust gas, as a result of the forced flow existing within the device, is forced through the porous wall over the entire length of the device.

Vice versa, advantages regarding the conversion of secondary emissions generated during the active particulate filter regeneration to harmless carbon dioxide, and in the particulate burnoff as such are achieved, when the oxidation-catalytic active coating is introduced into the porous walls of the wall-flow filter substrate between inlet and outlet channels or/and the exhaust gas flowing into the filter at first comes into contact with the oxidation-catalytic active coating.

Figure 2:
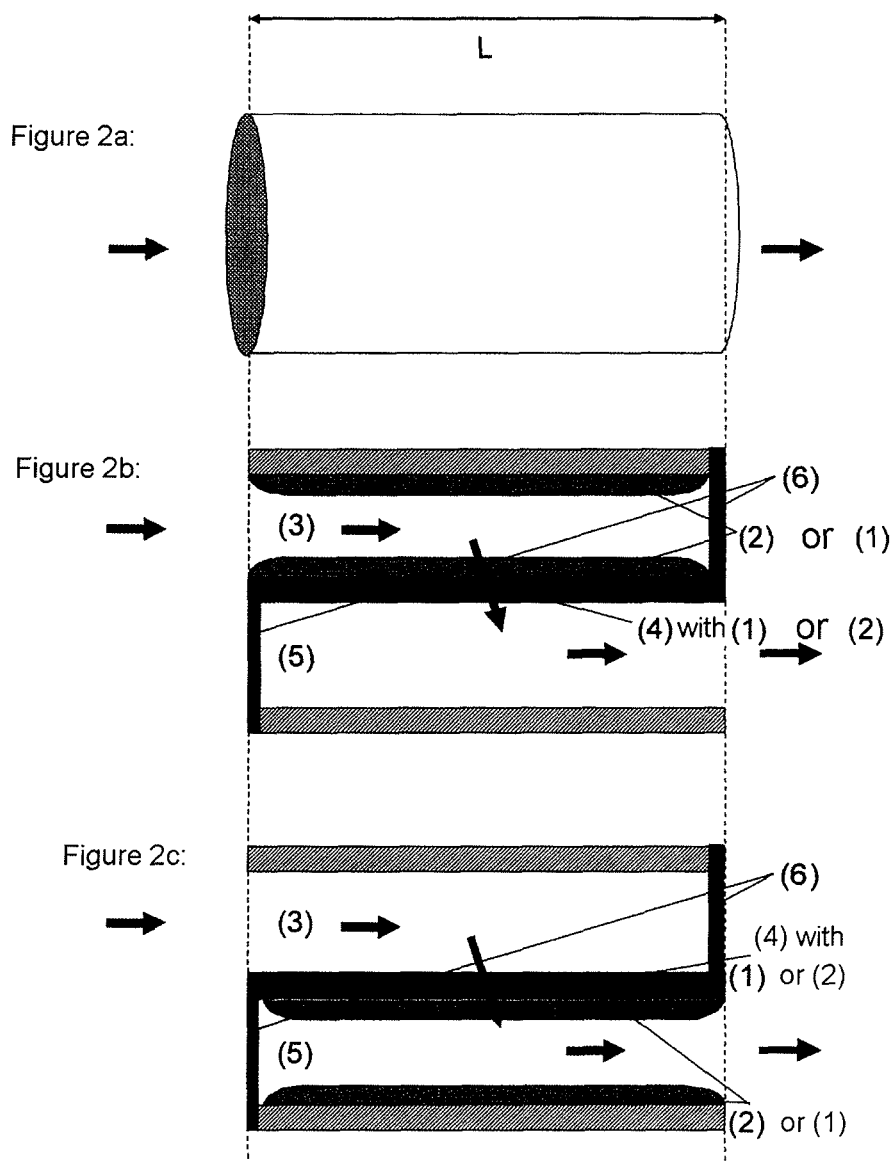

FIG. 2 shows a diagram of some of the latter embodiments, in which the said functional layers of the inventive particulate filter are arranged one on top of another ("layered" embodiments).

Which embodiment of the inventive catalytically active particulate filter should preferably be selected to enhance a particular effect of this multifunctional device is subject of standard optimization tests known to the skilled person and therefore does not require any more detailed explanation. Quite fundamentally, however, it should be stated that the above-described zoned embodiments shown in FIG. 1 are generally preferable to the "layered" embodiments, as shown by way of example in FIG. 2. This is because of the minimized contact area between the coating comprising the copper compound and the oxidation-catalytic active coating in the zoned embodiments. As already discussed, this gives the best possible minimization of a thermally induced migration of mobile copper atoms into the platinum group metal-containing coating and therefor prevents noble metal poisoning phenomena.

Irrespective of the spatial arrangement of the coatings on the inventive particulate filter, in preferred embodiments the copper compound is present in the form of copper oxide or in the form of a high-surface area, high-melting support oxide impregnated with a precursor compound which decomposes to copper oxide. Equally preferred are mixtures of these two components or mixtures of copper oxide with the untreated refractory high-surface area support oxide. Particular preference is given to copper oxide and mixtures of copper oxide with the untreated refractory high-surface area support oxide. The support oxide is preferably selected from the group consisting of aluminium oxide, rare earth-doped aluminium oxide, cerium oxide, cerium-zirconium mixed oxide, rare earth-doped cerium-zirconium mixed oxide and mixtures thereof. Particular preference is given to rare earth-doped aluminium oxides, cerium-zirconium mixed oxides and rare earth-doped cerium-zirconium mixed oxides.

The oxidation-catalytic active coating comprises—irrespective of the spatial arrangement thereof in the inventive particulate filter—preferably platinum and/or palladium, and active alumina. The platinum group metals are preferably present in a platinum:palladium ratio of 15:1 to 1:5, more preferably of 12:1 to 1:2 and most preferably of 6:1 to 1:1.

Furthermore, the oxidation-catalytic active coating preferably comprises one or more zeolite compounds which are selected from the group consisting of zeolite β (zeolite beta), zeolite Y, ZSM-5 and mixtures thereof. Such zeolite additions feature the ability, to store hydrocarbons temporarily, especially in cold-start phases, when the exhaust gas temperatures are still below the light-off temperatures of the noble metal-catalyzed HC oxidation reactions. These admixtures can accordingly prevent breakthroughs of HC emissions and its release into the environment.

Furthermore, additions of oxygen storage materials in the oxidation-catalytic active coatings lead to improvements in the HC and CO conversion when the upstream nitrogen oxide storage catalyst is exposed to rich exhaust gas. The oxidation-catalytic active coating therefore preferably also comprises one or more cerium-zirconium mixed oxides and/or rare earth-doped cerium-zirconium mixed oxides.

The inventive particulate filter is suitable especially for removing particulates and hydrogen sulphide from the exhaust gas of internal combustion engines operated predominantly under lean conditions.

By passing the exhaust gas to be cleaned over an upstream nitrogen oxide storage catalyst and an inventive catalytically active particulate filter arranged downstream of the nitrogen oxide storage catalyst, it is advantageously possible to remove nitrogen oxides and particulates from the exhaust gas of internal combustion engines operated predominantly under lean conditions. Further emission control units, especially for removing hydrogen sulphide emissions, are not needed in such an inventive emission control system, which saves costs and means that such an emission control system can be accommodated even in vehicles in which only a small amount of installation space is available.

The upstream nitrogen oxide storage catalyst is preferably arranged in a close-coupled position, since the highest exhaust gas temperatures typically exist here. The inventive particulate filter is suitable for use in underfloor position, but is preferably accommodated together with the nitrogen oxide storage catalyst, likewise in a close-coupled canning. This requires a particularly high thermal ageing stability of the emission control units, as possessed by the inventive particulate filter. The close-coupled arrangement of both units is advantageous because both, the active desulphurization of the nitrogen oxide storage catalyst and the active particulate filter regeneration, generally become possible without extensive, engine-independent heating measures.

The invention is explained in more detail hereinafter with reference to figures and examples.

FIG. 1: FIG. 1 shows a diagram of embodiments of the inventive particulate filter with zoned arrangement of the oxidation-catalytic active coating (1) and of the coating (2) comprising the copper compound. FIG. 1c shows that the coatings (1) and (2), in a wall-flow filter substrate with inlet channels (3) and outlet channels (5) which alternately have a gas-tight closure (6), are introduced in corresponding sequence into the porous wall (4) between inlet and outlet channel, an on-wall excess of the coating being possible in each case.

FIG. 2: FIG. 2 shows a diagram of embodiments of the inventive particulate filter, in which either the oxidation-catalytic active coating (1) or the coating (2) comprising the copper compound is introduced into the porous walls (4) of a wall-flow filter substrate between inlet channel (3) and outlet channel (5). The other coating in each case is either introduced as in FIG. 2b onto the walls of the inlet channel or as in FIG. 2c onto the walls of the outlet channel.

Figure 3:
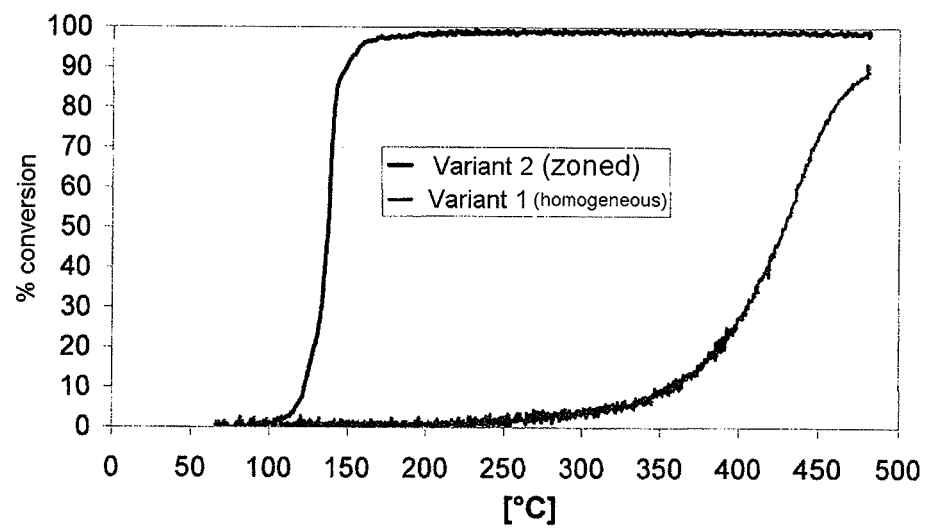

FIG. 3: Result of the evaluation of the light-off temperature of a particulate filter with a homogeneous coating containing a copper compound and noble metal ("option 1 (homogeneous)") and of an inventive particulate filter ("option 2 (zoned)"), in which the oxidation-catalytic active coating is present as the inlet zone and the coating comprising the copper compound as the outlet zone, in CO oxidation.

Figure 4:
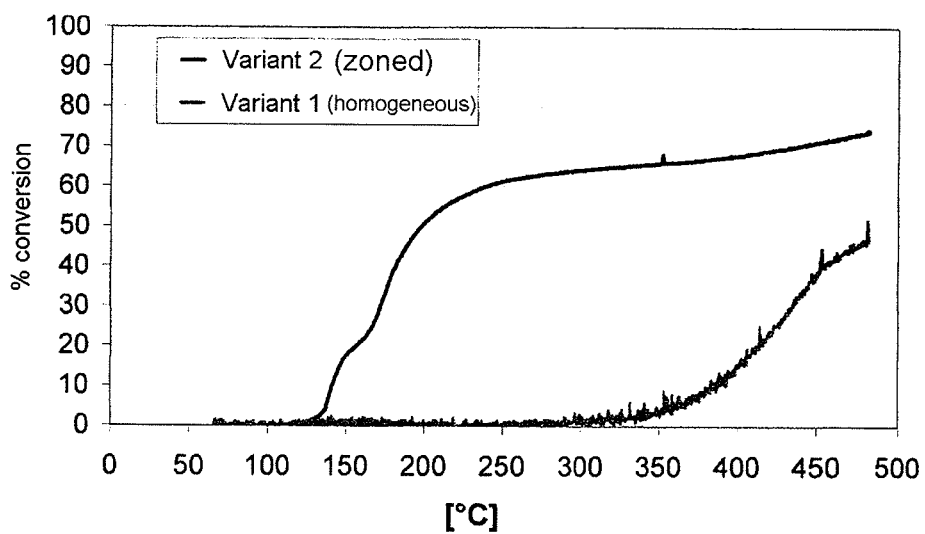

FIG. 4: Result of the evaluation of the light-off temperature of a particulate filter with a homogeneous coating containing a copper compound and noble metal ("option 1 (homogeneous)") and of an inventive particulate filter ("option 2 (zoned)"), in which the oxidation-catalytic active coating is present as the inlet zone and the coating comprising the copper compound as the outlet zone, in hydrocarbon oxidation.

Figure 5:
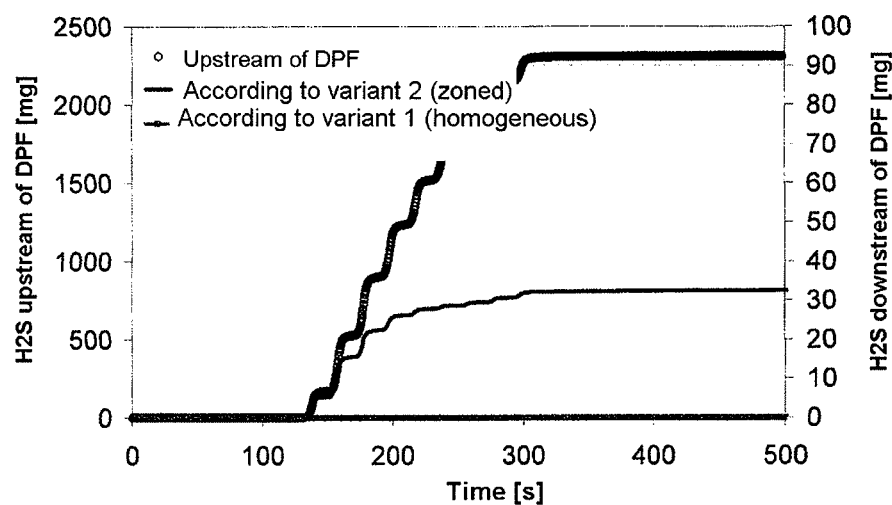

FIG. 5: Result of the evaluation of the ability to catalytically oxidize $H_2S$ to $SO_2$ under the conditions which can occur in the desulphurization of an upstream nitrogen oxide storage catalyst, over a particulate filter with a homogeneous coating containing a copper compound and noble metal ("option 1 (homogeneous)") and of an inventive particulate filter ("option 2 (zoned)"), in which the oxidation-catalytic active coating is present as the inlet zone and the coating comprising the copper compound as the outlet zone.

COMPARATIVE EXAMPLE

Particulate filter with a homogeneous coating which comprises a noble metal component for HC/CO oxidation and copper oxide for $H_2S$ oxidation—production:

To prepare a suitable coating suspension, a stabilized γ-alumina was first coated by means of the "incipient wetness" method with platinum and palladium in a ratio of 2:1. The noble metals were fixed on the alumina by a subsequent thermal treatment. The noble metal-containing powder thus obtained was suspended together with copper oxide (CuO) in water and milled until essentially all particles had a particle size of <10 μm. The $d_{90}$ of the particles in the coating suspension was <5 μm.

The coating suspension thus obtained was used to coat a commercial wall-flow filter substrate composed of silicon carbide (SiC). To this end, the filter substrate was aligned such that the flow channels were vertical. The suspension was then pumped into the substrate through the lower end face. After a short time, excess suspension was sucked out downward. By this method, the coating was essentially introduced into the pores of the substrate walls.

Subsequently, the filter was dried and calcined at 500° C. for 2 hours. The ready-coated filter ("option 1 (homogeneous)") had a noble metal loading of 1.236 g/l and a copper oxide loading of 15 g/l, each based on the total volume of the particulate filter.

Example

Inventive particulate filter with an oxidation-active, catalytic coating comprising platinum group metal, which is configured as the upstream zone, and a copper oxide-containing coating which is configured as the downstream zone—production:

To produce a coating suspension for the upstream zone (oxidation-catalytic active coating), a platinum/palladium-containing γ-alumina was first prepared, as described in the comparative example. The powder was suspended in water and milled according to the description from the comparative example.

The coating process likewise described above was used to coat a wall-flow filter substrate composed of SiC corresponding to the comparative example from the inlet side up to half its length with the suspension thus obtained. After this coating step, the filter contained the same amount of noble metal as the filter described in the comparative example ("option 1 (homogeneous)"), i.e. 1.236 g/l of noble metal, based on the total volume of the particulate filter.

To prepare a coating suspension for the downstream zone (the coating comprising the copper compound), copper oxide (CuO) and stabilized γ-alumina were suspended in a ratio of 1:1 in water and milled as described above. The suspension obtained was used to coat the filter according to the above-described process, by pumping the suspension into the substrate through the outlet end face. This was done only to an extent that the copper oxide-containing coating was introduced essentially into the pores of the substrate walls in the half of the filter substrate which had not been coated before.

Subsequently, the filter was dried and calcined at 500° C. for 2 hours. The ready-coated filter ("option 2 (zoned)") had a noble metal loading of 1.236 g/l and a copper oxide loading of 8 g/l, each based on the total volume of the particulate filter.

Both, the comparative filter ("option 1 (homogeneous)") with homogeneous coating as well as the inventive filter ("option 2 (zoned)") were evaluated with regard to their catalytic properties. Before the investigation, the filters were subjected to synthetic ageing under hydrothermal conditions. To this end, they were exposed to a temperature of 750° C. in a furnace for 16 hours in an atmosphere containing 10% by volume of water vapour and 10% by volume of oxygen in nitrogen.

The light-off temperatures for CO oxidation and hydrocarbon oxidation of both filters were determined on a laboratory model gas test bench of conventional design with a model exhaust gas with the following composition:

| Exhaust gas component | Concentration |
|---|---|
| CO | 350 ppm by vol. |
| $H_2$ | 116 ppm by vol. |
| $C_3H_6/C_3H_8$ (rel. to C1) | 270 ppm by vol. |
| $SO_2$ | 20 ppm by vol. |
| NO | 270 ppm by vol. |
| $CO_2$ | 10.7% by vol. |
| $H_2O$ | 10% by vol. |
| $O_2$ | 6% by vol. |
| $N_2$ | balance |

A space velocity of 25,000 $h^{-1}$ was established. The model exhaust gas was heated at a rate of 15°/min to determine the light-off temperatures.

FIGS. 3 and 4 show the light-off temperatures of the tested filters for carbon monoxide (FIG. 3) and hydrocarbons (FIG. 4). It is clearly evident that the homogeneously coated filter (comparative example, "option 1 (homogeneous)"), in spite of the same noble metal content, has a significantly higher light-off temperature in CO oxidation and in HC oxidation than the inventive filter "option 2 (zoned)". The CO/HC oxidation activity of "option 1 (homogeneous)" is therefore insufficient to contribute to efficient cleaning of the exhaust gas to remove these components. The inventive filter ("option 2 (zoned)") exhibits significantly better light-off performance both in CO oxidation and in HC oxidation, and can therefore make a significant contribution to the cleaning of the exhaust gas to remove carbon monoxide and hydrocarbons.

The ability to catalytically oxidize $H_2S$ to $SO_2$ under conditions which can occur during the desulphurization of an upstream nitrogen oxide storage catalyst was tested in a further model gas test. To this end, a system composed of a commercial nitrogen oxide storage catalyst and a particulate filter arranged directly downstream was sulphurized in each case ("option 1 (homogeneous)" and "option 2 (zoned)"; in both systems, the volumes of nitrogen oxide storage catalyst and particulate filter were identical). The amount of sulphur selected was approx. 1 g/l of catalyst volume, based on the nitrogen oxide storage catalyst, introduced by means of addition of 300 ppm by volume of $SO_2$ to the exhaust gas stream. Subsequently, a desulphation was simulated in each case at a temperature at the inlet of the particulate filter of 650° C. To this end, the air rate λ was lowered in ten intervals of 10 seconds each by increasing the CO and HC concentration (CO: 3.5% by vol.; HC: 3000 ppm by vol.) or by reducing the oxygen concentration of the exhaust gas stream to a value of about 0.9 (separation of these rich phases: likewise 10 s).

The results are shown in FIG. 5. The comparative filter ("option 1 (homogeneous)") converted $H_2S$ supplied completely, such that no hydrogen sulphide broke through downstream of the filter. The inventive filter ("option 2 (zoned)") achieved a conversion of about 98% of the hydrogen sulphide supplied under the selected conditions.

In summary, the results show that a completely satisfactory $H_2S$ block function with simultaneously excellent HC and CO conversion activity is achieved with the inventive particulate filter even after hydrothermal ageing. It thus becomes possible to provide an emission control system which, coupled with favourable manufacturing costs and minimized installation space requirement, can effectively remove nitrogen oxides, CO, HC and particulates from the exhaust gas of internal combustion engines operated predominantly under lean conditions, without breakthroughs during critical operating phases (for example during the desulphurization of the nitrogen oxide storage catalyst, or diesel particulate filter regeneration) of the undesired secondary emission of hydrogen sulphide $H_2S$, which is undesired because it has an unpleasant odour and is additionally toxic.

The invention claimed is:

1. A catalytically active particulate filter comprising
a filter body having an upstream zone and a downstream zone, and an inlet channel and an outlet channel which are separated by a porous wall,
said inlet channel having an interior wall with a first coating therein and said outlet channel having an interior wall with a second coating therein, and
(a) said first coating is an oxidation-catalytic active coating which comprises at least one catalytically active platinum group metal, and said second coating comprises a copper compound, or
(b) said first coating comprises a copper compound, and said second coating is an oxidation-catalytic active coating which comprises at least one catalytically active platinum group metal.

2. The catalytically active particulate filter according to claim 1, wherein the copper compound is in the form of copper oxide or in the form of a high-surface area, high-melting support oxide impregnated with a precursor compound which decomposes to copper oxide.

3. The catalytically active particulate filter according to claim 1, wherein the first coating is in the upstream zone and the second coating is in the downstream zone.

4. The catalytically active particulate filter according to claim 1, wherein
the upstream zone covers 10 to 90% of the total length of the filter body and the first coating is the oxidation catalytic active coating, and the downstream zone is the remainder of the length of the filter body and contains the second coating therein.

5. The catalytically active particulate filter of claim 1, wherein the support is γ-alumina.

6. The catalytically active particulate filter of claim 1, wherein the second coating further comprises one or more zeolite compounds selected from the group consisting of zeolite beta, zeolite Y, ZSM-5, and mixtures thereof.

7. The catalytically active particulate filter according to claim 1, wherein
the oxidation-catalytic active coating comprises platinum, palladium, or platinum and palladium, and active alumina.

8. The catalytically active particulate filter according to claim 1, wherein
the oxidation-catalytic active coating further comprises one or more zeolite compounds selected from the group consisting of zeolite β (zeolite beta), zeolite Y, ZSM-5 and mixtures thereof.

9. The catalytically active particulate filter according to claim 1, wherein
the oxidation-catalytic active coating comprises one or more cerium-zirconium mixed oxides and/or rare earth-doped cerium-zirconium mixed oxides.

10. The catalytically active particulate filter according to claim 1, wherein
the oxidation-catalytic active coating forms a zone which covers 10 to 90% of the total length of the filter body, while the coating comprising the copper compound forms a second zone which is attached to it and covers the rest of the length of the filter body.

11. The catalytically active particulate filter according to claim 10, wherein the filter body is a porous wall-flow filter substrate composed of cordierite, silicon carbide or aluminum titanate, and both coatings are present predominantly in the porous walls between inlet and outlet channels.

12. The catalytically active particulate filter according to claim 1, wherein
the filter body is a porous wall-flow filter substrate composed of cordierite, silicon carbide or aluminum titanate.

13. The catalytically active particulate filter according to claim 12, wherein
the coating comprising the copper compound has been introduced into the porous walls of the wall-flow filter substrate between inlet and outlet channels.

14. The catalytically active particulate filter according to claim 13, wherein
an exhaust gas flowing into the filter body first comes into contact with the coating comprising the copper compound.

15. The catalytically active particulate filter according to claim 13, wherein
an exhaust gas flowing into the filter body at first comes into contact with the oxidation-catalytic active coating.

16. The catalytically active particulate filter according to claim 12, wherein
the oxidation-catalytic active coating has been introduced into the porous walls of the wall-flow filter substrate between inlet and outlet channels.

17. A process for removing nitrogen oxides and particulates from the exhaust gas of internal combustion engines operated predominantly under lean conditions, by passing the exhaust gas to be cleaned at first over an upstream nitrogen oxide storage catalyst and subsequently over a downstream catalytically active particulate filter according to claim 1.

\* \* \* \* \*